April 28, 1936. S. J. GOLDSMITH Re. 19,947

GARMENT PROTECTOR.

Original Filed Nov. 3, 1930

Inventor:
Samuel J. Goldsmith
By Stevens and Batchelor
Attys.

Reissued Apr. 28, 1936

Re. 19,947

UNITED STATES PATENT OFFICE 19,947

GARMENT PROTECTOR

Samuel J. Goldsmith, Chicago, Ill.

Original No. 1,878,771, dated September 20, 1932, Serial No. 493,125, November 3, 1930. Application for reissue November 13, 1935, Serial No. 49,645

2 Claims. (Cl. 223—98)

My invention relates to protectors for wearing apparel, and in the nature of hoods which are deposited over the garments to protect the same from dust, and more particularly to such hoods as permit the viewing of an identifying tag or label carried by the garment.

One object of the invention is to construct the novel protector almost entirely of a transparent paper called "Cellophane", that identifying tags or labels on a particular garment may be readily viewed whatever their position, and also that the garment may be so fully exposed to view that it may be identified by its own form or appearance.

A further object of the invention is to construct the novel protector with a folded spacing ply enabling it to be expanded to fit a garment of thickness or bulk, such as an overcoat or a fur coat.

A still further object of the invention is to design the novel protector with a marginal beading which reinforces its edges against injury and aids the protector in retaining its shape.

Another object of the invention is to join the cross ply with the sides of the protector by sewing the cross ply into the beading of the top and ends of the protector.

An additional object of the invention is to provide a cross beading medially of the protector to define an opening for the hook which supports the garment, such cross beading also constituting a reinforcement.

A final but nevertheless important object of the invention is to construct the novel protector of inexpensive fabric in connection with the "Cellophane" front and back whereby to enable the article to be sold cheaply.

With the above objects in view and any others that may suggest themselves from the specification and claims to follow, a better understanding of the invention may be had by reference to the accompanying drawing, in which—

I am aware of the fact that hood type of protectors have been used in the past for garments, which are hung in stores or cleaning establishments that dust may not fall and soil the same. However, these protectors either had to be made with opening leaves or with windows for facility in examining the garments for identification. Obviously, where an article of this kind is made with leaves or other mechanical contrivances for opening it, it becomes more or less involved and too expensive for ordinary use. Also where a window is used to permit the inspection of the garment for identification, it will frequently develop that the identifying tag or label is not in registration with the window, requiring the protector to be removed before the garment can be identified.

Figure 1:
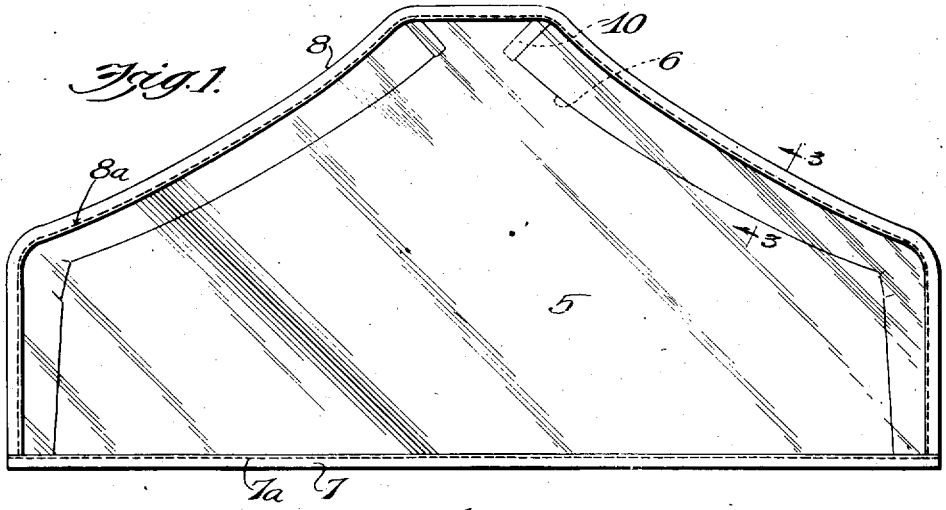
Fig. 1 is an elevation of the novel garment protector.

In my embodiment, the protector is of the conventional hood shape, as indicated in Fig. 1, but it will be noted that practically its entire expanse is filled by the front and back sheets 5 of "Cellophane", which is a transparent paper. Thus, not only can the identifying tag or label be readily seen irrespective of its position on the garment, but a glance at the garment itself will identify it by its form or appearance in case it does not carry a tag or label, enabling quick identification or inspection without the removal of the hood.

For purposes of durability, I do not extend the front and back sheets or the top and ends, but make these of a cross strip 6 of thin but durable cloth or fabric. This strip is divided medially to permit the hook of the garment hanger (not shown) to rise through the protector; and I prefer to construct the strip 6 with one or more longitudinal folds 6a in accordion style in order to adapt the protector to thin garments such as dresses when closed, as well as thick garments such as overcoats or fur coats when expanded.

Owing to the frail and limp nature of the "Cellophane" front and back of the protector, I have seen fit to provide a novel marginal and medial reinforcing element. Thus, at the bottom the front and back each receives a folded beading 7 of fabric, the sheet being received in the fold of the beading and the triple ply being secured by stitching 7a. This beading also extends endwise of the protector to secure the lower ends of the fabric strip 6. The top of each "Cellophane" sheet is reinforced by another beading 8, which extends continuously from one bottom corner of the protector to the other. In this case, not only is the top formation of the "Cellophane" sheets secured in the fold of the beading, but the marginal edge of the strip 6 is also deposited in the fold of the beading, stitching 8a serving to secure the assembly. Where the opening 9 occurs at the top of the protector, it is not only bounded by the beading 8 in front and back but a cross beading 10 is secured to the inner edges of the strip sections 6 by suitable stitching to define the sides of the opening.

It will be noted that by the construction described above, the protector is not only reinforced against tearing or distorting influences when handled, but also kept in proper shape by the form of the beading. By the folding of the cross strip 6, the protector is initially as flat and thin as an envelope; yet, the protector readily expands to receive a garment of extra thickness. The top beading reinforces and secures the fabric cross strip relative to the "Cellophane" front and back; and the cross beading 10 provides a transverse reinforcement and protector for the cross strip sections in case they should suffer injury from the passage or catching of the garment hook as the hood is mounted over the hanger. Finally, it will be obvious that the material entering into the novel protector is of an inexpensive nature and the stitching may be done rapidly by machine, resulting in an article of very low cost.

Figure 2:
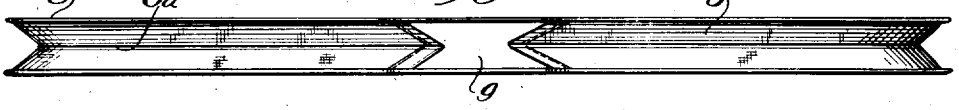
Fig. 2 is a plan view of the same.
Figure 4:
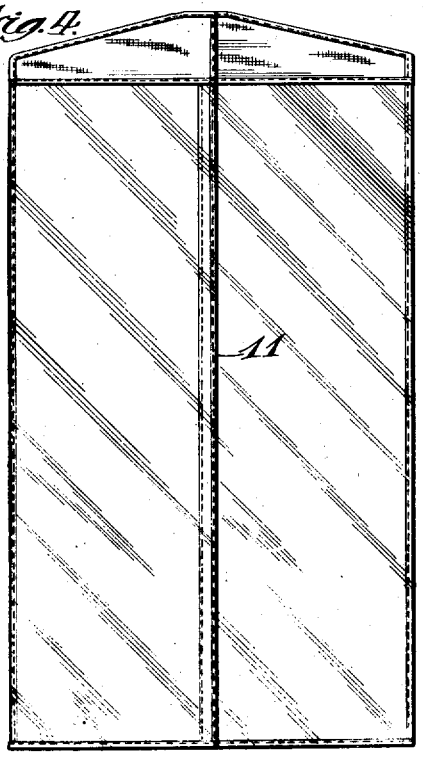
Fig. 4 is an elevation of a modification.
Figure 3:
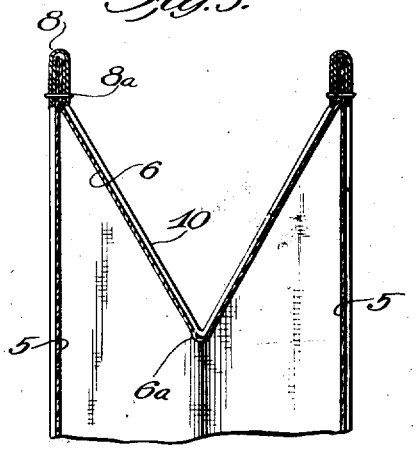
Fig. 3 is an enlarged section on the line 3—3 of Fig. 1.

While the preferred form of the invention has been shown in Figs. 1 to 3 and embodies a shoulder type of protector, I have also illustrated the applicability of my invention to a full length type of protector, as shown in Fig. 4. In this type, however, the front of the protector is for the most part separable by an overlap assembly 11 as indicated to permit the front of the protector to be opened for the removal of the garment.

Having thus described the invention, what I claim as new and desired to secure by Letters Patent is:

1. As a new article of manufacture, a garment protector of the hood type comprising similarly shaped, separately formed front and back sheets positioned in opposed relation and formed of transparent "Cellophane" type material and with arched top edges and substantially vertical side edges, and a spacing strip of thin cloth extending between, and following the contour of the top and side edges of the two sheets and embodying a hole-forming interruption at its top portion for the passage of a coat hanger hook, and also embodying a transverse reentrant accordion formation throughout the length thereof whereby the sheets are movable to and from one another, said strip having the inner faces of the side margins thereof fitting flatly against the inner faces of the side and top margins of the sheets and having said magins thereof stitched to said side and top margins of the sheets slightly inwards of the side and top edges of said sheets.

2. As a new article of manufacture, a garment protector of the hood-type comprising similarly shaped, separately formed front and back sheets positioned in opposed relation and formed of transparent "Cellophane" type material and with arched top edges and substantially vertical side edges, a spacing strip of thin cloth extending between and longitudinally of, and having the side margins thereof stitched to, the top and side margins of the two sheets and having a transverse reentrant accordion formation of such depth as to permit the sheets to be separated to form a comparatively large dome-like space in the protector for the top of the garment, and also having a hole-forming interruption in its top portion for the passage of a coat hanger hook, cloth reinforcing beading extending around and longitudinally of the stitched margins of the sheets and spacing strip and secured in place by the stitching, and an additional cloth reinforcing beading folded around, and extending longitudinally of, and stitched to, the bottom margins of the sheets and the end margins of the spacing strip.

SAMUEL J. GOLDSMITH.